United States Patent
Jiang et al.

(10) Patent No.: US 10,847,146 B2
(45) Date of Patent: Nov. 24, 2020

(54) MULTIPLE VOICE RECOGNITION MODEL SWITCHING METHOD AND APPARATUS, AND STORAGE MEDIUM

(71) Applicant: Baidu Online Network Technology (Beijing) Co., Ltd., Beijing (CN)

(72) Inventors: Bing Jiang, Beijing (CN); Xiangang Li, Beijing (CN); Ke Ding, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 107 days.

(21) Appl. No.: 16/201,722

(22) Filed: Nov. 27, 2018

(65) Prior Publication Data
US 2019/0096396 A1    Mar. 28, 2019

Related U.S. Application Data

(63) Continuation of application No. PCT/CN2016/097417, filed on Aug. 30, 2016.

(30) Foreign Application Priority Data

Jun. 16, 2016    (CN) .......................... 2016 1 0429948

(51) Int. Cl.
*G10L 15/197* (2013.01)
*G10L 15/00* (2013.01)
(Continued)

(52) U.S. Cl.
CPC ............ *G10L 15/197* (2013.01); *G06F 40/20* (2020.01); *G10L 15/005* (2013.01); *G10L 15/02* (2013.01); *G10L 15/22* (2013.01); *G10L 25/78* (2013.01)

(58) Field of Classification Search
None
See application file for complete search history.

(56) References Cited

U.S. PATENT DOCUMENTS 8,352,245 B1 *   1/2013   Lloyd ................... G10L 15/265
                                                     704/9
9,812,130 B1 *   11/2017  Corfield ................ G10L 15/183
(Continued)

FOREIGN PATENT DOCUMENTS

CN    101354886 A    1/2009
CN    101923854 A    12/2010
(Continued)

OTHER PUBLICATIONS

Search Report for related International Application No. PCT/CN2016/097417: dated Jan. 26, 2017.

*Primary Examiner* — Thuykhanh Le
(74) *Attorney, Agent, or Firm* — Miller, Matthias & Hull LLP

(57) ABSTRACT

Embodiments of the present disclosure disclose a method and apparatus for switching multiple speech recognition models. The method includes: acquiring at least one piece of speech information in user input speech; recognizing the speech information and matching a linguistic category for the speech information to determine a corresponding target linguistic category based on a matching degree; and switching a currently used speech recognition model to a speech recognition model corresponding to the target linguistic category. The embodiments of the present disclosure determine the corresponding target linguistic category based on the matching degree by recognizing the speech information and matching the linguistic category for the speech information, and switch the currently used speech recognition model to the speech recognition model corresponding to the target linguistic category.

11 Claims, 3 Drawing Sheets

(51) Int. Cl.
  *G06F 40/20* (2020.01)
  *G10L 15/02* (2006.01)
  *G10L 15/22* (2006.01)
  *G10L 25/78* (2013.01)

(56) References Cited

U.S. PATENT DOCUMENTS

| | | | |
|---|---|---|---|
| 2004/0230420 A1* | 11/2004 | Kadambe | G10L 15/07 704/205 |
| 2006/0184357 A1* | 8/2006 | Ramsey | G06F 40/263 704/9 |
| 2007/0100618 A1* | 5/2007 | Lee | G10L 15/1822 704/238 |
| 2008/0255843 A1 | 10/2008 | Sun et al. | |
| 2010/0063819 A1* | 3/2010 | Emori | G10L 15/197 704/251 |
| 2010/0070277 A1* | 3/2010 | Arakawa | G10L 15/02 704/246 |
| 2010/0114558 A1* | 5/2010 | Fluhr | G06F 40/49 704/5 |
| 2010/0153219 A1* | 6/2010 | Mei | G06F 16/958 705/14.73 |
| 2010/0161337 A1* | 6/2010 | Pulz | G10L 15/005 704/257 |
| 2010/0191530 A1* | 7/2010 | Nakano | G10L 15/32 704/244 |
| 2011/0166859 A1* | 7/2011 | Suzuki | G10L 15/005 704/246 |
| 2011/0295590 A1* | 12/2011 | Lloyd | G10L 15/30 704/8 |
| 2012/0191449 A1* | 7/2012 | Lloyd | H04M 1/6075 704/231 |
| 2012/0278061 A1* | 11/2012 | Weinstein | G10L 15/063 704/2 |
| 2013/0236332 A1 | 9/2013 | Chen | |
| 2013/0238332 A1* | 9/2013 | Chen | G10L 15/183 704/240 |
| 2014/0032214 A1* | 1/2014 | Ljolje | G10L 15/14 704/235 |
| 2014/0214419 A1* | 7/2014 | Rao | G10L 15/063 704/240 |
| 2014/0358533 A1* | 12/2014 | Kurata | G10L 15/01 704/231 |
| 2014/0358539 A1* | 12/2014 | Rao | G10L 15/183 704/243 |
| 2014/0372118 A1* | 12/2014 | Yassa | G10L 15/28 704/235 |
| 2015/0039299 A1* | 2/2015 | Weinstein | G10L 15/16 704/202 |
| 2015/0120277 A1* | 4/2015 | Song | G06F 40/58 704/2 |
| 2015/0228279 A1* | 8/2015 | Biadsy | G10L 15/26 704/235 |
| 2015/0364129 A1* | 12/2015 | Gonzalez-Dominguez | G10L 15/005 704/251 |
| 2015/0371633 A1* | 12/2015 | Chelba | G10L 15/063 704/240 |
| 2016/0005400 A1* | 1/2016 | Hanazawa | G10L 15/32 704/257 |
| 2016/0035344 A1* | 2/2016 | Gonzalez-Dominguez | G10L 15/005 704/254 |
| 2016/0140954 A1 | 5/2016 | Park | |
| 2016/0140964 A1* | 5/2016 | Connell, II | G10L 15/07 704/231 |
| 2016/0180838 A1* | 6/2016 | Parada San Martin | G06N 3/02 704/232 |
| 2016/0203828 A1* | 7/2016 | Gomez | G10L 15/20 704/226 |
| 2016/0240188 A1* | 8/2016 | Seto | G06F 40/242 |
| 2016/0275946 A1* | 9/2016 | Caseiro | G10L 15/197 |
| 2016/0293162 A1* | 10/2016 | Takahashi | G06F 40/30 |
| 2016/0316059 A1* | 10/2016 | Nuta | G06Q 10/04 |
| 2017/0075953 A1* | 3/2017 | Bozkaya | G06F 16/24522 |
| 2017/0104785 A1* | 4/2017 | Stolfo | G06N 20/00 |
| 2017/0213551 A1* | 7/2017 | Ji | B60W 50/10 |
| 2017/0229124 A1* | 8/2017 | Strohman | G10L 15/19 |
| 2017/0289766 A1* | 10/2017 | Scott | G06F 3/011 |
| 2019/0051306 A1* | 2/2019 | Torama | G10L 15/02 |

FOREIGN PATENT DOCUMENTS

| | | |
|---|---|---|
| CN | 103038817 A | 4/2013 |
| CN | 104160440 A | 11/2014 |
| CN | 105609101 A | 5/2016 |
| CN | 105679314 A | 6/2016 |

* cited by examiner

MULTIPLE VOICE RECOGNITION MODEL SWITCHING METHOD AND APPARATUS, AND STORAGE MEDIUM

CROSS-REFERENCE TO RELATED APPLICATIONS

This is a continuation of International Application PCT/CN2016/097417, with an international filing date of Aug. 30, 2016, which claims priority to Chinese Application No. 201610429948.8, filed on Jun. 16, 2016, entitled "Method and Apparatus for switching multiple speech recognition models," the contents of which are incorporated herein by reference in their entireties.

TECHNICAL FIELD

Embodiments of the present disclosure relate to the field of speech recognition technology, and more specifically relate to a method and apparatus for switching multiple speech recognition models.

BACKGROUND

With the development of science and technology, the speech input technology has been widely used, since it is less restricted by the scenario and is more quick and convenient than hand input. For example, existing search engines have all added the speech search function.

At present, although Mandarin has become the main communication language for the Chinese people, in terms of local areas, there is still a great demand for the exchange of local dialects. The existing speech recognition engine only supports a specific language, and the speech recognition outside the language is basically unusable. Therefore, the user generally needs to select a speech recognition engine for the specific language in advance before using.

However, once the user needs to perform language switching, it is necessary to enter the speech recognition engine setting interface and manually switch to the dialect in use to perform the speech recognition. Obviously, this language switching method is relatively inefficient and not smart enough.

SUMMARY

Embodiments of the present disclosure provide a method and apparatus for switching multiple speech recognition models to realize the automatic switching of speech recognition models between different languages, improve the efficiency of switching speech recognition models, and make speech recognition more smart.

In a first aspect, the present disclosure provides a method for switching multiple speech recognition models, including: acquiring at least one piece of speech information in user input speech; recognizing the speech information and matching a linguistic category for the speech information to determine a corresponding target linguistic category based on a matching degree; and switching a currently used speech recognition model to a speech recognition model corresponding to the target linguistic category.

In a second aspect, the present disclosure provides an apparatus for switching multiple speech recognition models, including: a speech acquisition module, configured to acquire at least one piece of speech information in user input speech; a linguistic recognition module, configured to recognize the speech information and match a linguistic category for the speech information to determine a corresponding target linguistic category based on a matching degree; and a model switching module, configured to switch a currently used speech recognition model to a speech recognition model corresponding to the target linguistic category.

In a third aspect, the present disclosure provides a storage medium comprising a computer executable instruction, the computer executable instruction, when executed by a computer processor, implementing a method for switching multiple speech recognition models, the method including: acquiring at least one piece of speech information in user input speech; recognizing the speech information and matching a linguistic category for the speech information to determine a corresponding target linguistic category based on a matching degree; and switching a currently used speech recognition model to a speech recognition model corresponding to the target linguistic category.

In a fourth aspect, the present disclosure provides a device for switching multiple speech recognition models, comprising: one or more processors; and a storage device, storing one or more programs. The one or more programs, when executed by the one or more processors, cause the one or more processors to implement the following operations: acquiring at least one piece of speech information in user input speech; recognizing the speech information and matching a linguistic category for the speech information to determine a corresponding target linguistic category based on a matching degree; and switching a currently used speech recognition model to a speech recognition model corresponding to the target linguistic category.

The embodiments of the present disclosure determine the corresponding target linguistic category based on the matching degree by recognizing the speech information and matching the linguistic category for the speech information, and switch the currently used speech recognition model to the speech recognition model corresponding to the target linguistic category. The automatic switching of speech recognition models between different languages not only improves the efficiency of switching speech recognition models, but also makes speech recognition smarter.

DETAILED DESCRIPTION OF EMBODIMENTS

The present disclosure is further described in detail below with reference to the accompanying drawings and the embodiments. It may be understood that the specific embodiments described herein are merely illustrative of the present disclosure and are not intended to limit the disclosure. It should also be noted that, for the convenience of description, not the whole structure, but only parts related to the present disclosure are shown in the accompanying drawings.

First Embodiment

Figure 1:
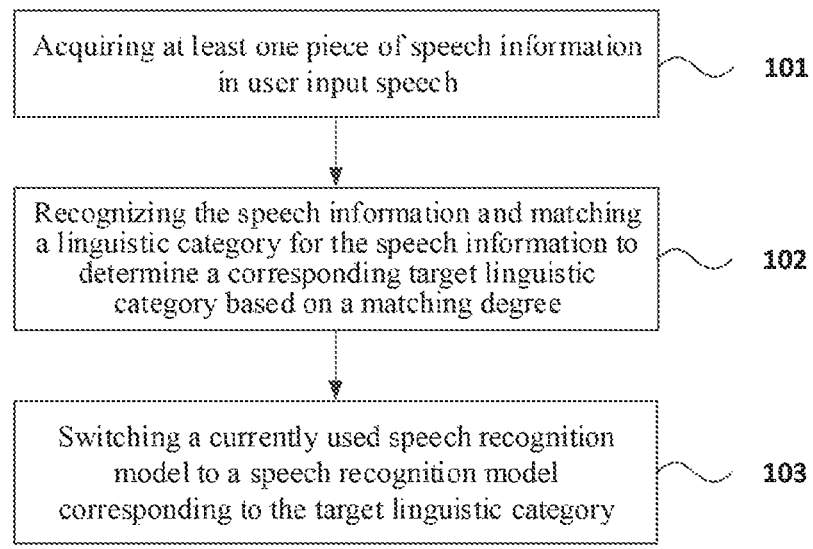
FIG. 1 is a flowchart of a method for switching multiple speech recognition models according to a first embodiment of the present disclosure.

FIG. 1 is a flowchart of a method for switching multiple speech recognition models according to the first embodiment of the present disclosure. The present embodiment may be applicable to the case of switching between multiple speech recognition models. The method may be implemented by the apparatus for switching multiple speech recognition models provided by the embodiment of the present disclosure, and the apparatus may be integrated into a mobile terminal, a fixed terminal, or a server. As shown in FIG. 1, the method specifically includes the following steps.

S101, acquiring at least one piece of speech information in user input speech.

Here, the speech information may be part of the speech information of the intercepted input speech, or may be a piece of complete speech information of a user. The speech information may include one or multiple pieces of speech sentences.

Specifically, speech may be collected through the microphone of a terminal. For example, a speech input button is provided on the speech input interface. When the user activates the button, the speech information of the user may be collected.

S102, recognizing the speech information and matching a linguistic category for the speech information to determine a corresponding target linguistic category based on a matching degree.

The linguistic category includes but is not limited to a language category and a dialect category. The language category includes languages of various countries, including, for example, Chinese, English, Russian, French, German, etc., and the dialect category includes but is not limited to dialects of various countries. Taking China as an example, the dialect category includes such as Shandong dialect, northeast dialect, Beijing dialect, Shaanxi dialect, and Guangdong dialect.

Specifically, the speech information inputted in various linguistic categories by users may be collected in advance, and the speech recognition model is trained and obtained through the classification algorithm. The speech recognition model includes speech inputted in various linguistic categories. When the speech recognition model is used to recognize the to-be-classified speech information, the classification algorithm is used again to classify the to-be-classified speech information. If the to-be-classified speech information is classified into the Shandong dialect, the Shandong dialect is determined to be the dialect matching the speech information.

S103, switching a currently used speech recognition model to a speech recognition model corresponding to the target linguistic category.

After determining the target linguistic category matching the speech information, the currently used speech recognition model is switched to a speech recognition model corresponding to the target linguistic category, and the corresponding speech recognition model is used to recognize subsequent speech inputted by the user.

When there are multiple target linguistic categories matching the speech information, for example, besides belonging to classified into the Shandong dialect, the speech information is also classified into the Henan dialect. At this time, the target linguistic category is determined based on the matching degree. For example, the linguistic category having the highest matching degree with the speech information is defined as the target linguistic category. Alternatively, the linguistic category having the matching degree exceeding a preset threshold is defined as the target linguistic category.

The present embodiment determines the corresponding target linguistic category based on the matching degree by recognizing the speech information and matching the linguistic category for the speech information, and switches the currently used speech recognition model to the speech recognition model corresponding to the target linguistic category. The automatic switching of speech recognition models between different languages not only improves the efficiency of switching speech recognition models, but also makes speech recognition smarter.

Based on the above embodiment, the recognizing the speech information and matching a linguistic category for the speech information to determine a corresponding target linguistic category based on a matching degree includes: recognizing the speech information based on features of at least two linguistic categories to obtain a similarity between the speech information and each of the linguistic categories, and defining the similarity as the matching degree of the linguistic category.

The similarity between the speech information and each linguistic category may be obtained by any one of the following methods: recognizing the speech information based on features of at least two of the linguistic categories to obtain a confidence of the speech information belonging to each linguistic category, and defining the confidence as the similarity of the linguistic category; or recognizing the speech information based on features of at least two of the linguistic categories to obtain a linguistic score of the speech information belonging to each linguistic category, and defining the linguistic score as the similarity of the linguistic category; or recognizing the speech information based on features of at least two of the linguistic categories to obtain a probability of the speech information belonging to each linguistic category, and defining the probability as the similarity of the linguistic category.

The linguistic score may be obtained by scoring using an existing speech test model, the probability may be obtained by converting based on the linguistic score using a probability conversion formula, and the confidence is a probability interval.

On the basis of the foregoing embodiment, when the corresponding target linguistic category cannot be determined based on only one piece of speech sentence, in order to further improve the recognition accuracy, the recognizing the speech information and matching a linguistic category for the speech information to determine a corresponding target linguistic category based on a matching degree includes: recognizing at least two pieces of speech sentences included in the speech information to obtain a matching degree between each speech sentence and a linguistic category; and determining an initial linguistic category based on the matching degree, and determining the corresponding target linguistic category based on a matching degree between each speech sentence and the initial linguistic category.

The at least two pieces of speech sentences are sequentially acquired according to the time sequence. If the corresponding target linguistic category cannot be determined based on a first piece of speech sentence, acquiring a second piece of speech sentence, and so on, until the corresponding target linguistic category can be determined. If the corresponding target linguistic category can be determined according to the first piece of speech sentence, it is not necessary to acquire the second piece of speech sentence.

Specifically, a first piece of speech sentence is first acquired, and the first piece of speech sentence is recognized to obtain a matching degree between the first piece of speech sentence and a linguistic category. If the matching degree exceeds a preset matching degree, the linguistic category corresponding to the first piece of speech sentence is defined as the target linguistic category. If the matching degree does not exceed the preset matching degree, prompting the user to whether manually switch the speech recognition model, and/or acquiring a second piece of speech sentence, and recognizing the second piece of speech sentence to obtain a matching degree between the second piece of speech sentence and a linguistic category, and so on, until the target linguistic category meeting the preset condition is obtained.

In addition, a speech sentence may correspond to multiple linguistic categories, as shown in Table 1 below, the linguistic category having the highest matching degree may be defined as the initial linguistic category, based on the matching degree of the speech sentence with respect to each linguistic category. For example, as shown in Table 1, since the Shandong dialect has a higher probability than the Henan dialect and the Anhui dialect, the Shandong dialect is defined as the initial linguistic category of the speech sentence 1.

For example, for the speech sentence 1, if the probability of belonging to recognized as the Shandong dialect is 0.99, since the 0.99 exceeds the preset threshold (e.g., 0.95), it is determined that the target linguistic category corresponding to the speech information is Shandong dialect. If the probability of belonging to recognized as the Shandong dialect is 0.93, the user is prompted whether to manually switch the speech recognition model, or acquiring the second piece of speech sentence, that is, the speech sentence 2. If the second piece of speech sentence is still recognized as the Shandong dialect, and the corresponding probability is 0.95, it is determined that the target linguistic category corresponding to the speech information is Shandong dialect.

On the basis of the foregoing embodiment, the determining the corresponding target linguistic category based on a matching degree between each speech sentence and the initial linguistic category includes: calculating a product of probabilities of the speech sentences not belonging to the initial linguistic category, and determining the corresponding target linguistic category based on the product.

Specifically, the product of the probabilities of the speech sentences not belonging to the initial linguistic category is calculated, and if the product of the probabilities is less than a preset threshold, the initial linguistic category is defined as the corresponding target linguistic category.

For example, if the speech information includes three pieces of speech sentences, for the convenience of description, the speech sentences are respectively recorded as speech sentence 1, speech sentence 2, and speech sentence 3. By recognizing the three pieces of speech sentences, it is assumed that the matching results of each piece of speech sentence and linguistic categories are shown in Table 1 below.

TABLE 1

| Speech sentence | Matching result |
| --- | --- |
| speech sentence 1 | probability of belonging to the Shandong dialect is 0.83 |
| | probability of belonging to the Henan dialect is 0.07 |
| | probability of belonging to the Anhui dialect is 0.1 |
| speech sentence 2 | probability of belonging to the Shandong dialect is 0.9 |
| | probability of belonging to the Henan dialect is 0.06 |
| | probability of belonging to the Anhui dialect is 0.04 |
| speech sentence 3 | probability of belonging to the Shandong dialect is 0.85 |
| | probability of belonging to the Henan dialect is 0.05 |
| | probability of belonging to the Anhui dialect is 0.1 |

Based on the probabilities corresponding to the dialects, it may be preliminarily determined that the dialect corresponding to the speech sentence 1, the speech sentence 2 and the speech sentence 3 is the Shandong dialect. Since the probability of each speech sentence belonging to the Shandong dialect does not exceed the preset threshold of 0.99, the probability of not belonging to the Shandong dialect is further calculated. The result is shown in Table 2. Based on the probability, it is further determined whether the speech information belongs to the Shandong dialect.

TABLE 2

| Speech sentence | Switching error probability |
| --- | --- |
| speech sentence 1 | probability of not belonging to the Shandong dialect is 0.17 |
| speech sentence 2 | probability of not belonging to the Shandong dialect is 0.1 |
| | probability of not belonging to the Shandong dialect in two consecutive times is 0.017 |
| speech sentence 3 | probability of not belonging to the Shandong dialect is 0.15 |
| | probability of not belonging to the Shandong dialect in three consecutive times is 0.00255 |

By calculation, the probability of not belonging to the Shandong dialect in two consecutive times is 0.017, which is greater than the preset threshold (e.g., 0.005), then no switching is performed and the discrimination is continued; and the probability of not belonging to the Shandong dialect in three consecutive times is 0.00255, the switching error probability is less than a preset threshold, then it is determined with high confidence that the speech information belongs to the Shandong dialect and the switching is performed.

On the basis of the foregoing embodiment, before the recognizing the speech information and matching a linguistic category for the speech information to determine a corresponding target linguistic category based on a matching degree, the method further includes: performing any one of the following preprocessing on the speech information: a speech feature extraction, an effective speech detection, a speech vector representation, and a model scoring test.

On the basis of the foregoing embodiment, in order to facilitate the operation of the user and improve the recognition rate, the method further includes: recognizing the speech information, and displaying a prompt message to prompt a user to perform manual switching, if a recognition result does not meet a preset condition.

The preset condition is that the matching degree of the speech category matching the speech information exceeds a preset threshold, and the matching degree may be measured by a linguistic score, a probability, or a confidence.

On the basis of the foregoing embodiment, to further improve the recognition accuracy, the recognizing the speech information and matching a linguistic category for the speech information to determine a corresponding target linguistic category based on a matching degree includes: recognizing the speech information and matching a linguistic category for the speech information; determining at least two candidate linguistic categories having matching degrees meeting the preset condition; querying a user historical speech recognition record to determine a linguistic category used by the user historically; and selecting a linguistic category consistent with the linguistic category used by the user historically from the at least two candidate linguistic categories as the target linguistic category.

For example, if at least two candidate linguistic categories having similar matching degrees are obtained for a certain piece of speech information, and if it is difficult to determine which one is the target linguistic category, in order to improve the recognition accuracy, the historical speech recognition record corresponding to the user is obtained. The historical speech recognition record includes a linguistic category commonly used by the user, and if the historical speech recognition record includes one of the candidate linguistic categories, the included linguistic category is defined as the target linguistic category.

The above embodiment determines the corresponding target linguistic category based on the matching degree by recognizing the speech information and matching the linguistic category for the speech information, and switches the currently used speech recognition model to the speech recognition model corresponding to the target linguistic category. The automatic switching of speech recognition models between different languages not only improves the efficiency of switching speech recognition models, but also makes speech recognition smarter.

Second Embodiment

Figure 2:
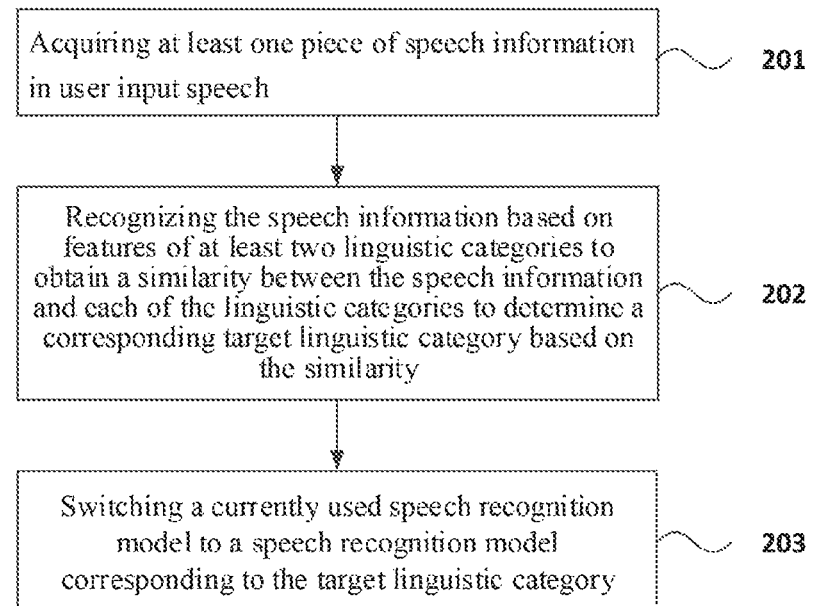
FIG. 2 is a flowchart of a method for switching multiple speech recognition models according to a second embodiment of the present disclosure.

FIG. 2 is a flowchart of a method for switching multiple speech recognition models according to the second embodiment of the present disclosure. In the present embodiment, based on the foregoing embodiment, the recognizing the speech information and matching a linguistic category for the speech information to determine a corresponding target linguistic category based on a matching degree is optimized by recognizing the speech information based on features of at least two linguistic categories to obtain a similarity between the speech information and each of the linguistic categories, and defining the similarity as the matching degree of the linguistic category. As shown in FIG. 2, it specifically includes the following steps.

S201, acquiring at least one piece of speech information in user input speech.

S202, recognizing the speech information based on features of at least two linguistic categories to obtain a similarity between the speech information and each of the linguistic categories to determine a corresponding target linguistic category based on the similarity.

S203, switching a currently used speech recognition model to a speech recognition model corresponding to the target linguistic category.

For a detailed description of the above steps, reference may be made to the above embodiment, and detailed description thereof will be omitted.

The present embodiment recognizes the acquired speech information based on features of at least two linguistic categories to obtain a similarity between the speech information and each of the linguistic categories to determine a corresponding target linguistic category based on the similarity, and switches the currently used speech recognition model to the speech recognition model corresponding to the target linguistic category. The automatic switching of speech recognition models between different languages not only improves the efficiency of switching speech recognition models, but also makes speech recognition smarter.

Third Embodiment

Figure 3:
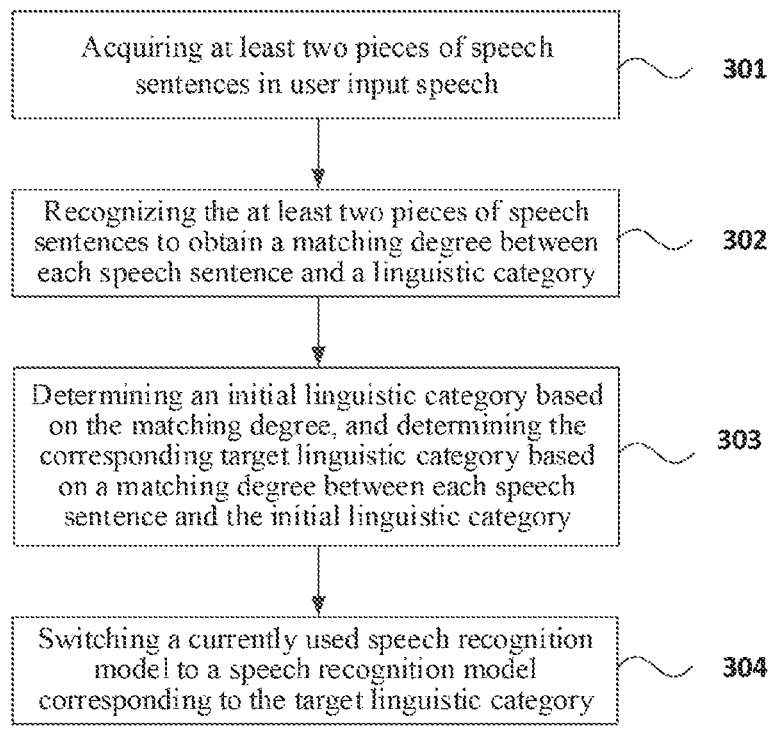
FIG. 3 is a flowchart of a method for switching multiple speech recognition models according to a third embodiment of the present disclosure.

FIG. 3 is a flowchart of a method for switching multiple speech recognition models according to the third embodiment of the present disclosure. In the present embodiment, based on the foregoing embodiment, the recognizing the speech information and matching a linguistic category for the speech information to determine a corresponding target linguistic category based on a matching degree is optimized by recognizing at least two pieces of speech sentences included in the speech information to obtain a matching degree between each speech sentence and a linguistic category, determine an initial linguistic category based on the matching degree, and determine the corresponding target linguistic category based on a matching degree between each speech sentence and the initial linguistic category. As shown in FIG. 3, it specifically includes the following steps.

S301, acquiring at least two pieces of speech sentences in user input speech.

S302, recognizing the at least two pieces of speech sentences to obtain a matching degree between each speech sentence and a linguistic category.

S303, determining an initial linguistic category based on the matching degree, and determining the corresponding target linguistic category based on a matching degree between each speech sentence and the initial linguistic category.

A product of probabilities of the speech sentences not belonging to the initial linguistic category is calculated, and the corresponding target linguistic category is determined based on the product.

For example, the product of the probabilities of the speech sentences not belonging to the initial linguistic category is calculated, and if the product of the probabilities is less than a preset threshold, the initial linguistic category is defined as the corresponding target linguistic category. Otherwise, a prompt is displayed to prompt the user to manually switch.

S304, switching a currently used speech recognition model to a speech recognition model corresponding to the target linguistic category.

In the short-term speech complex environment, if the recognition accuracy of a single-sentence speech sentence is above 90%, then the probability of the single-sentence speech error switching recognizer is 0.1, using the high confidence decision strategy. Therefore, the probability of erroneous operation after N speech sentences is the $N^{th}$ power of 0.1. For example, if the user's misjudgment threshold is set to be 0.0001, N=4, that is, in general conditions, as long as four speech sentences inputted by the user are acquired, the ultra-low precision misjudgment may be realized, and the accurate probability of the switching is 99.9999%. At the same time, in order to facilitate the user to carry out friendly interaction, under certain thresholds, the user may be reminded in real time whether to perform the speech recognition model switching, to facilitate the user to perform the switching operation more friendly and conveniently.

Fourth Embodiment

Figure 4:
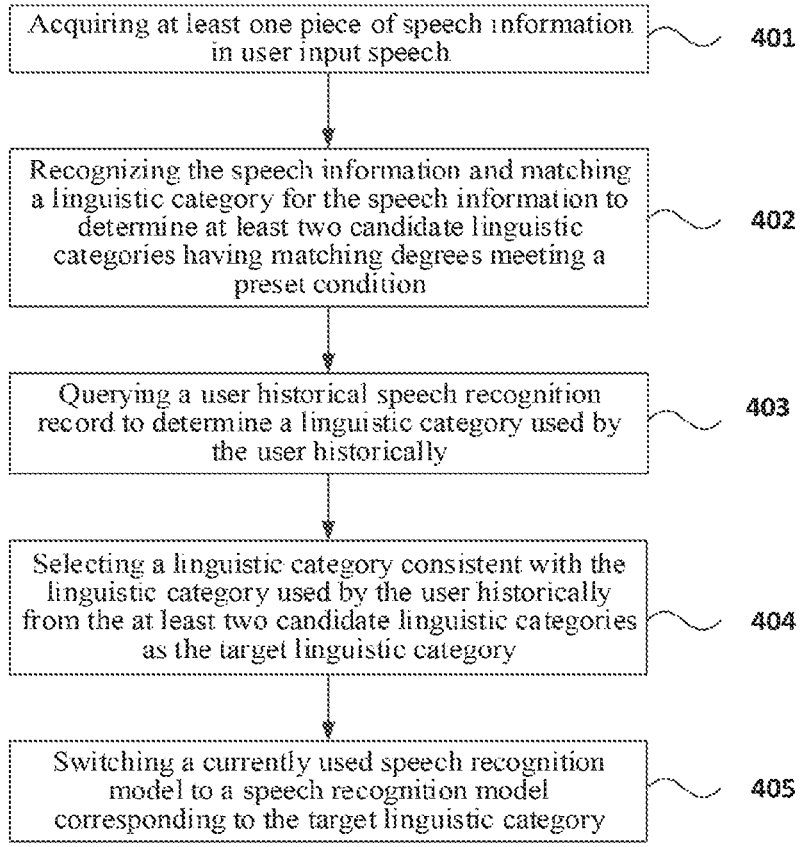
FIG. 4 is a flowchart of a method for switching multiple speech recognition models according to a fourth embodiment of the present disclosure.

FIG. 4 is a flowchart of a method for switching multiple speech recognition models according to the fourth embodiment of the present disclosure. In the present embodiment, based on the foregoing embodiment, the recognizing the speech information and matching a linguistic category for the speech information to determine a corresponding target linguistic category based on a matching degree is optimized by recognizing the speech information and matching a linguistic category for the speech information, determining at least two candidate linguistic categories having matching degrees meeting a preset condition, querying a user historical speech recognition record to determine a linguistic category used by the user historically; and selecting a linguistic category consistent with the linguistic category used by the user historically from the at least two candidate linguistic categories as the target linguistic category. As shown in FIG. 4, the specifically includes the following steps.

S401, acquiring at least one piece of speech information in user input speech.

S402, recognizing the speech information and matching a linguistic category for the speech information to determine at least two candidate linguistic categories having matching degrees meeting a preset condition.

S403, querying a user historical speech recognition record to determine a linguistic category used by the user historically.

S404, selecting a linguistic category consistent with the linguistic category used by the user historically from the at least two candidate linguistic categories as the target linguistic category.

S405, switching a currently used speech recognition model to a speech recognition model corresponding to the target linguistic category.

The present embodiment recognizes the acquired speech information and matches a linguistic category for the speech information to determine a corresponding target linguistic category based on the matching degree, switches the currently used speech recognition model to the speech recognition model corresponding to the target linguistic category. The automatic switching of speech recognition models between different languages not only improves the efficiency of switching speech recognition models, but also makes speech recognition smarter.

Fifth Embodiment

Figure 5:
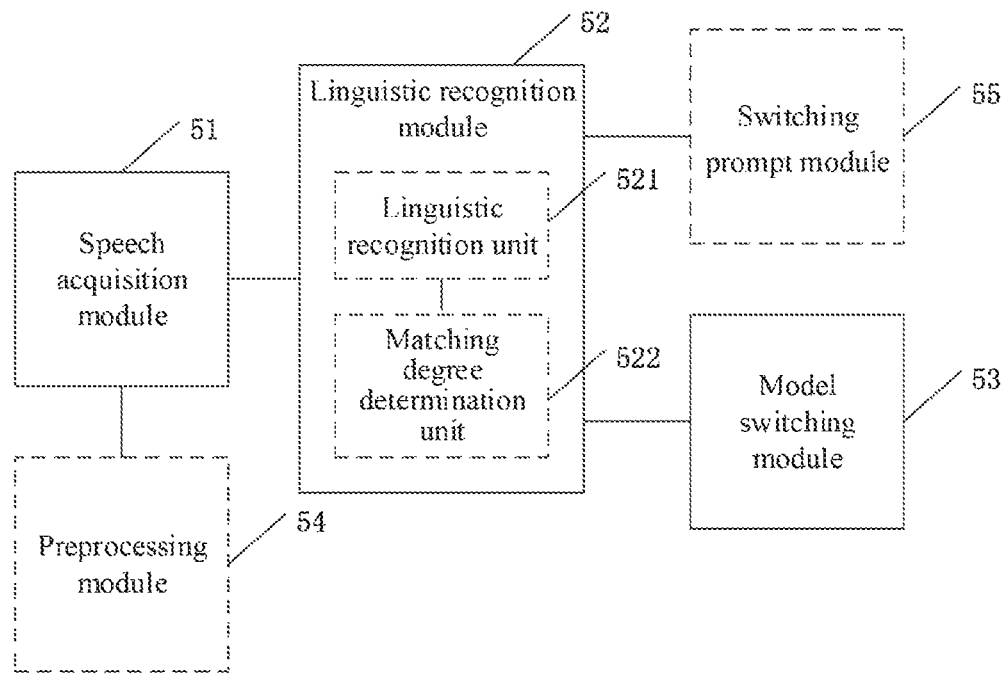
FIG. 5 is a structural diagram of an apparatus for switching multiple speech recognition models according to a fifth embodiment of the present disclosure.

FIG. 5 is a schematic structural diagram of an apparatus for switching multiple speech recognition models according to the fifth embodiment of the present disclosure. The apparatus may be implemented by software or hardware. The apparatus may be integrated into a mobile terminal, a fixed terminal, or a server. As shown in FIG. 5, the specific structure of the apparatus is as follow: a speech acquisition module 51, a linguistic recognition module 52 and a model switching module 53.

The speech acquisition module 51 is configured to acquire at least one piece of speech information in user input speech.

The linguistic recognition module 52 is configured to recognize the speech information and match a linguistic category for the speech information to determine a corresponding target linguistic category based on a matching degree.

The model switching module 53 is configured to switch a currently used speech recognition model to a speech recognition model corresponding to the target linguistic category.

The apparatus for switching multiple speech recognition models of the present embodiment is used to perform the method for switching multiple speech recognition models described in the above embodiments. The technical principle and the generated technical effects thereof are similar, and detailed description thereof will be omitted.

Based on the foregoing embodiment, the linguistic recognition module 52 is specifically configured to recognize the speech information based on features of at least two linguistic categories to obtain a similarity between the speech information and each of the linguistic categories, and define the similarity as the matching degree of the linguistic category.

Based on the foregoing embodiment, the linguistic recognition module 52 includes: a linguistic recognition unit 521 and a matching degree determination unit 522.

The linguistic recognition unit 521 is configured to recognize at least two pieces of speech sentences included in the speech information to obtain a matching degree between each speech sentence and a linguistic category.

The matching degree determination unit 522 is configured to determine an initial linguistic category based on the matching degree, and determine the corresponding target linguistic category based on a matching degree between each speech sentence and the initial linguistic category.

Based on the foregoing embodiment, the matching degree determination unit 522 is specifically configured to calculate a product of probabilities of the speech sentences not belonging to the initial linguistic category, and determine the corresponding target linguistic category based on the product.

Based on the foregoing embodiment, the apparatus further includes: a preprocessing module 54.

The preprocessing module 54 is configured to, before the linguistic recognition module 52 recognizing the speech information and matching a linguistic category for the speech information to determine a corresponding target linguistic category based on a matching degree, perform any one of the following preprocessing on the speech information: a speech feature extraction, an effective speech detection, a speech vector representation, and a model scoring test.

Based on the foregoing embodiment, the apparatus further includes: a switching prompt module 55.

The switching prompt module 55 is configured to recognize the speech information, and display a prompt message to prompt a user to perform manual switching if a recognition result does not meet a preset condition.

On the basis of the foregoing embodiment, the linguistic recognition module 52 is specifically configured to recognize the speech information and match a linguistic category for the speech information; determine at least two candidate linguistic categories having matching degrees meeting a preset condition; query a user historical speech recognition record to determine a linguistic category used by the user historically; and select a linguistic category consistent with the linguistic category used by the user historically from the at least two candidate linguistic categories as the target linguistic category.

The apparatus for switching multiple speech recognition models described in the above embodiments is used to perform the method for switching multiple speech recognition models described in the above embodiments. The technical principle and the generated technical effects thereof are similar, and detailed description thereof will be omitted.

Sixth Embodiment

The sixth embodiment of the present disclosure provides a device for switching multiple speech recognition models, including the apparatus for switching multiple speech recognition models according to embodiments of the present disclosure. The device for switching multiple speech recognition models may be integrated into a mobile terminal, a fixed terminal or a server.

Figure 6:
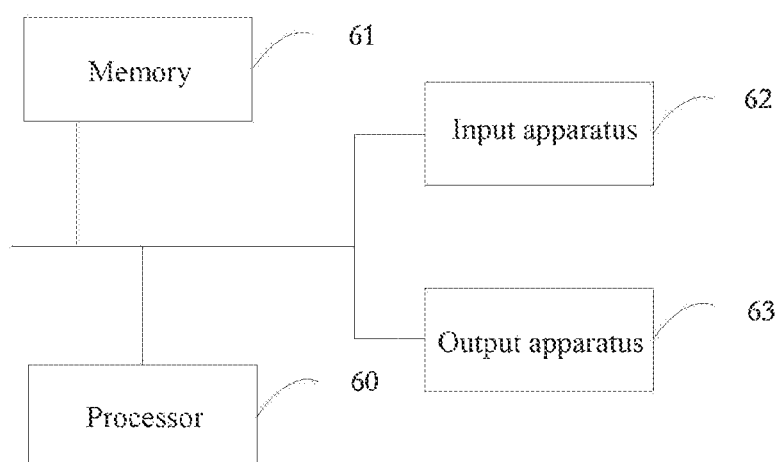
FIG. 6 is a structural diagram of a device for switching multiple speech recognition models according to a sixth embodiment of the present disclosure.

Specifically, as illustrated in FIG. 6, an embodiment of the present disclosure provides the device for switching multiple speech recognition models. The device for switching multiple speech recognition models include a processor 60, a memory 61, an input apparatus 62 and an output apparatus 63. The number of the processor 60 in the device for switching multiple speech recognition models may be one or more, and one processor 60 is taken as an example in FIG. 6. The processor 60, the memory 61, the input apparatus 62 and the output apparatus 63 in the device for switching multiple speech recognition models may be connected via a bus or in other modes. Connection by a bus is used as an example in FIG. 6.

As a computer readable storage medium, the memory 61 may be used to store software programs, computer executable programs, and modules, for example, the program instructions/modules corresponding to the method for switching multiple speech recognition models in the embodiments of the present disclosure (for example, the speech acquisition module 51, the linguistic recognition module 52 and the model switching module 53 in the device for switching multiple speech recognition models). The processor 60 runs the software programs, instructions and modules stored in the memory 61 to execute various functional applications and data processing of the device for switching multiple speech recognition models, that is, to implement the method for switching multiple speech recognition models of the above method embodiments.

The memory 61 may include a program storage area and a data storage area. The program storage area may store an operating system and an application required for at least one function. The data storage area may store data and the like created according to the usage of the device for switching multiple speech recognition models. In addition, the memory 61 may include a high-speed random access memory, and may also include a non-volatile memory, e.g., at least one disk storage device, a flash memory device or other non-volatile solid-state storage devices. In some embodiments, the memory 61 may further include memories remotely arranged relative to the processor 60, where the remote memories may be connected to the terminal device by a network. An example of the above network includes but not limited to, the Internet, an enterprise intranet, a local area network, a mobile communications network, and a combination thereof.

An embodiment of the present disclosure further provides a storage medium comprising a computer executable instruction, the computer executable instruction, when executed by a computer processor, implementing a method for switching multiple speech recognition models, the method including: acquiring at least one piece of speech information in user input speech; recognizing the speech information and matching a linguistic category for the speech information to determine a corresponding target linguistic category based on a matching degree; and switching a currently used speech recognition model to a speech recognition model corresponding to the target linguistic category.

Through the description of the foregoing implementations, a person skilled in the art may clearly know that the present disclosure may be implemented by means of software and necessary general hardware or of course by means of hardware, but in most cases the former is the better implementation manner. Based on such an understanding, the technical solutions of the present disclosure in essence or that part of contribution to the prior art may be embodied in the form of software products, which may be stored in computer-readable storage media, such as floppy disk, read-only memory (ROM), random access memory (RAM), Flash, hard disk or optical disk of a computer, including some instructions so that a computer device (a personal computer, a server, or a network device, etc.) is caused to perform the methods as recited in each embodiment of the present disclosure.

It should be noted that in the embodiments of the device for switching multiple speech recognition models described above, the respective units and modules are divided according to the functional logics, but not limited to the above-described division, as long as the corresponding function may be achieved. In addition, the specific name of each of functional units is merely for ease of mutual distinction and is not intended to limit the scope of the present disclosure.

The above descriptions are merely specific implementations of the present disclosure, but the protection scope of the present disclosure is not limited thereto. Any variations or replacements that can be easily conceived of by those skilled in the art within the technical scope disclosed by the present disclosure shall be encompassed by the protection scope of the present disclosure. Therefore, the protection scope of the present disclosure shall be subject to the protection scope of the claims.

What is claimed is:

1. A method for switching multiple speech recognition models, the method comprising:
    acquiring at least one piece of speech information in user input speech;
    recognizing the speech information and matching a linguistic category for the speech information to determine a corresponding target linguistic category based on a matching degree; and
    switching a currently used speech recognition model to a speech recognition model corresponding to the target linguistic category,
    wherein the recognizing the speech information and matching a linguistic category for the speech information to determine a corresponding target linguistic category based on a matching degree comprises:

recognizing at least two pieces of speech sentences included in the speech information to obtain a matching degree between each speech sentence and a linguistic category; and determining an initial linguistic category based on the matching degree, and calculating a product of probabilities of the speech sentences not belonging to the initial linguistic category, and determining the corresponding target linguistic category based on the product.

2. The method according to claim 1, wherein the recognizing the speech information and matching a linguistic category for the speech information to determine a corresponding target linguistic category based on a matching degree comprises:

recognizing the speech information based on features of at least two linguistic categories to obtain a similarity between the speech information and each of the linguistic categories, and defining the similarity as the matching degree of the linguistic category.

3. The method according to claim 1, wherein before the recognizing the speech information and matching a linguistic category for the speech information to determine a corresponding target linguistic category based on a matching degree, the method further comprises:

performing any one of following preprocessing on the speech information: a speech feature extraction, an effective speech detection, a speech vector representation, and a model scoring test.

4. The method according to claim 1, further comprising:
recognizing the speech information, and displaying a prompt message to prompt a user to perform manual switching if a recognition result does not meet a preset condition.

5. The method according to claim 1, wherein the recognizing the speech information and matching a linguistic category for the speech information to determine a corresponding target linguistic category based on a matching degree comprises:

recognizing the speech information and matching a linguistic category for the speech information;

determining at least two candidate linguistic categories having matching degrees meeting a preset condition;

querying a user historical speech recognition record to determine a linguistic category used by the user historically; and selecting a linguistic category consistent with the linguistic category used by the user historically from the at least two candidate linguistic categories as the target linguistic category.

6. An apparatus for switching multiple speech recognition models, the apparatus comprising:

at least one processor; and a memory storing instructions, the instructions when executed by the at least one processor, cause the at least one processor to perform operations, the operations comprising:

acquiring at least one piece of speech information in user input speech;

recognizing the speech information and matching a linguistic category for the speech information to determine a corresponding target linguistic category based on a matching degree; and switching, a currently used speech recognition model to a speech recognition model corresponding to the target linguistic category, wherein the recognizing the speech information and matching a linguistic category for the speech information to determine a corresponding target linguistic category based on a matching degree comprises:

recognizing at least two pieces of speech sentences included in the speech information to obtain a matching degree between each speech sentence and a linguistic category; and determining an initial linguistic category based on the matching degree, and calculating a product of probabilities of the speech sentences not belonging to the initial linguistic category, and determining the corresponding target linguistic category based on the product.

7. The apparatus according to claim 6, wherein the recognizing the speech information and matching a linguistic category for the speech information to determine a corresponding target linguistic category based on a matching degree comprises:

recognizing the speech information based on features of at least two linguistic categories to obtain a similarity between the speech information and each of the linguistic categories, and defining the similarity as the matching degree of the linguistic category.

8. The apparatus according to claim 6, the operations further comprising:

performing any one of following preprocessing on the speech information: a speech feature extraction, an effective speech detection, a speech vector representation, and a model scoring test.

9. The apparatus according to claim 6, the operations further comprising:

recognizing the speech information, and displaying a prompt message to prompt a user to perform manual switching if a recognition result does not meet a preset condition.

10. The apparatus according to claim 6, wherein the recognizing the speech information and matching a linguistic category for the speech information to determine a corresponding target linguistic category based on a matching degree comprises:

recognizing the speech information and match a linguistic category for the speech information;

determining at least two candidate linguistic categories having matching degrees meeting a preset condition;

querying a user historical speech recognition record to determine a linguistic category used by the user historically; and selecting a linguistic category consistent with the linguistic category used by the user historically from the at least two candidate linguistic categories as the target linguistic category.

11. A non-transitory computer storage medium storing a computer program, the computer program when executed by one or more processors, causes the one or more processors to perform operations, the operations comprising:

acquiring at least one piece of speech information in user input speech;

recognizing the speech information and matching a linguistic category for the speech information to determine a corresponding target linguistic category based on a matching degree; and switching a currently used speech recognition model to a speech recognition model corresponding to the target linguistic category, wherein the recognizing the speech information and matching a linguistic category for the speech information to determine a corresponding target linguistic category based on a matching degree comprises:

recognizing at least two pieces of speech sentences included in the speech information to obtain a matching degree between each speech sentence and a linguistic category; and determining an initial linguistic category based on the matching degree, and calculating a product of probabilities of the speech sentences not belonging to the initial linguistic category, and determining the corresponding target linguistic category based on the product.

* * * * *